United States Patent
Rimmele et al.

(10) Patent No.: US 11,747,177 B2
(45) Date of Patent: Sep. 5, 2023

(54) PRESSURE MEASURING DEVICE COMPRISING AN AIR PASSAGE PROVIDED AT A PLUG CONNECTION

(71) Applicant: IFM Electronic gmbH, Essen (DE)

(72) Inventors: Robert Rimmele, Fronreute (DE); Ruben Bentele, Tettnang (DE)

(73) Assignee: IFM Electronic GmbH, Essen (DE)

( * ) Notice: Subject to any disclaimer, the term of this patent is extended or adjusted under 35 U.S.C. 154(b) by 168 days.

(21) Appl. No.: 17/535,679

(22) Filed: Nov. 25, 2021

(65) Prior Publication Data
US 2022/0163356 A1    May 26, 2022

(30) Foreign Application Priority Data
Nov. 26, 2020   (DE) .............................. 102020131299

(51) Int. Cl.
*G01D 11/26*   (2006.01)
*G01D 11/24*   (2006.01)

(52) U.S. Cl.
CPC ............ *G01D 11/245* (2013.01); *G01D 11/26* (2013.01)

(58) Field of Classification Search
CPC ....... G01D 11/26; G01D 11/245; G01D 11/24
See application file for complete search history.

(56) References Cited

FOREIGN PATENT DOCUMENTS

| DE | 10 2012 201 018 B4 | 7/2013 | | |
|---|---|---|---|---|
| EP | 1 148 326 A2 | 10/2001 | | |
| EP | 3269921 A1 * | 1/2018 | ........... | E21B 33/037 |

* cited by examiner

*Primary Examiner* — Jamel E Williams
(74) *Attorney, Agent, or Firm* — Patent Technologies, LLC; Robert D. Gunderman, Jr.

(57) ABSTRACT

A pressure measuring device is disclosed that includes a housing, a pressure measuring cell, evaluation electronics for processing measurement signals generated by the pressure measuring cell, a plug connection formed at the housing for transmitting the processed measurement signals to an external receiving unit, and an air passage which enables pressure compensation between the interior of the housing and the exterior of the housing. The plug connection includes a cylindrical sleeve and an insert part disposed therein, wherein the air passage is formed as a two-part barrier having a first liquid barrier formed as a duct system from the interior of the housing via the plug connection and a second liquid barrier having a liquid-repellent diaphragm and disposed in an area within the duct system, and wherein the insert part has a first recess into which the diaphragm is inserted. The insert part has a second recess, which is arranged at a distance from the first recess and in which a light-emitting diode signalling a status of the measuring device is inserted, wherein the cylindrical sleeve also has a recess at the side opposite the light-emitting diode, which recess on the one hand, acting as a part of the duct system or air passage, allows pressure compensation and, on the other hand, allows the light-emitting diode to be visible.

6 Claims, 2 Drawing Sheets

PRESSURE MEASURING DEVICE COMPRISING AN AIR PASSAGE PROVIDED AT A PLUG CONNECTION

CROSS REFERENCE TO RELATED PATENT APPLICATIONS

This application claims priority to German Patent Application DE 10 2020 131 299.7 filed on Nov. 26, 2020 entitled "Druckmessgerät mit am Steckeranschluss vorgesehenem Luftdurchgang" (Pressure Measuring Device Comprising an Air Passage Provided at a Plug Connection) by Robert Rimmele and Ruben Bentele, the entire disclosure of which is incorporated herein by reference in its entirety.

BACKGROUND OF THE INVENTION

1. Field of the Invention

This invention relates generally to a pressure measuring device, and more specifically to a pressure measuring device comprising an air passage provided at a plug connection.

2. Description of Related Art

In process measurement technology, measuring devices are used to monitor the properties of a fluid, for example with respect to pressure, temperature, flow rate, level. Here, depending on the application, the measuring devices are exposed to different weather conditions or must be cleaned frequently to maintain hygienic conditions, which is achieved, for example, by means of a high-pressure or steam jet. Most pressure measuring devices require pressure compensation, since the measured pressure values must be brought into relation with the ambient pressure in order to output the relative pressure.

For this purpose, one-piece barriers in the form of diaphragms are known from the prior art. DE 10232028 B4 suggests, for example, to close a pressure compensation opening in the housing wall by means of a liquid-repellent but nevertheless gas-permeable element and thus to achieve a pressure compensation between the interior of the housing and the external environment of the housing. Here, the element consists of a diaphragm or a film-like diaphragm, e.g. made of PTFE.

However, here the disadvantage is that the films or diaphragms are exposed to a high-pressure or steam jet used for cleaning purposes without protection and could be destroyed.

For this reason, impact protection devices are used, particularly in pressure measuring devices, which impact protection devices are designed as small, cylindrical bodies projecting laterally from the housing of the measuring device and comprise lateral openings to prevent the direct jet from hitting the diaphragm or film. However, such impact protection devices are unsuitable, in particular for so-called compact devices, which are designed as pure transmitter devices without an operating or display unit. The specifications for a very small and compact housing design do not permit parts that protrude laterally and thus also increase the diameter of the measuring device.

German patent DE 10 2012 201018 B4 therefore proposes to realize the air passage for pressure compensation between the interior of the housing and the exterior of the housing via a duct system, which is formed from the interior of the housing via the plug connection, wherein the liquid-repellent diaphragm is arranged within this duct system. The vent opening as a part of the air passage is visible only as a small opening from the outside at the front side of the plug connection. If, during cleaning operations, liquid or vapor should enter the duct system of the air passage via the vent opening, the diaphragm provides a barrier that prevents moisture from entering the interior of the measuring device.

It is thus an object of the invention to further improve the pressure compensation possibility in the above-mentioned measuring devices in such a way, that the diaphragm is well protected against damages of all kinds, that it is also suitable for compact devices, that it can be realized very cost-effectively due to simple manufacture and assembly, and that moisture which has penetrated into the measuring device therethrough can also quickly escape again.

The object pointed out above is achieved according to the invention by a pressure measuring device comprising the features of claim 1. Advantageous embodiments of the invention are provided in the subclaims.

BRIEF SUMMARY OF THE INVENTION

The present invention is based on the idea to functionally combine two units of a pressure measuring device which per se are independent of one another, and to advantageously use the synergy effect resulting therefrom in the form of a compact design of the measuring device. These two units are, on the one hand, the air passage necessary in relatively measuring pressure measuring devices for pressure compensation between the interior of the housing and the external environment and, on the other hand, a display device in the form of a light-emitting diode signalling a status of the pressure measuring device. The status is, for example, the switching state, the readiness for operation, a possible malfunction, etc. And these two units are now combined in an advantageous manner, so that practically no changes need to be made to the external design of the measuring device and, moreover, no additional components are required.

As already known from the prior art, the air passage is designed as a two-part barrier comprising a first liquid barrier, which is designed as a duct system from the interior of the housing via the plug connection, and a second liquid barrier, which comprises a liquid-repellent diaphragm and is arranged in an area within the duct system. In the pressure measuring device according to the invention, the insert part now comprises, in addition to a first recess into which the diaphragm is inserted, a second recess which is arranged at a distance from the first recess. The light-emitting diode is inserted into this second recess. Since the cylindrical sleeve of the plug connection is located in front of the light-emitting diode, it also has a recess on the side opposite the light-emitting diode, so that the light-emitting diode is visible from the outside. At the same time, this recess in the cylindrical sleeve is also part of the duct system or the air passage and thus enables said pressure compensation. Preferably, to this end the duct system extends between the cylindrical sleeve and the insert part. The cylindrical sleeve then quasi represents an impact device, so that the diaphragm is protected from the direct action of a high-pressure or steam jet.

Advantageously, the insert part is designed as a plastic injection-molded part and the cylindrical sleeve is made of metal.

Here, the light-emitting diode can be arranged in a sealed manner within the second recess or alternatively behind a transparent cover and shine therethrough.

The present invention also expressly encompasses an embodiment in which the light-emitting diode itself is arranged further inside the panel connector or the housing and the status information is visible from the outside via translucent bodies, e.g. light guides.

In the following, the present invention is explained in more detail by means of exemplary embodiments with reference to the drawings.

BRIEF DESCRIPTION OF THE DRAWINGS

The present invention is explained by way of example with reference to the attached drawings based on preferred exemplary embodiments, wherein the features shown below both individually and in combination may represent an aspect of the invention. In the drawings.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings and claims.

DESCRIPTION OF TIE PREFERRED EMBODIMENTS

For a general understanding of the present invention, reference is made to the drawings. The present invention will be described by way of example, and not limitation. Modifications, improvements and additions to the invention described herein may be determined after reading this specification and viewing the accompanying drawings; such modifications, improvements, and additions being considered included in the spirit and broad scope of the present invention and its various embodiments described or envisioned herein.

The present invention relates to a Pressure Measuring Device Comprising an Air Passage Provided at a Plug Connection.

In the following description of the preferred embodiments, the same reference symbols designate identical or comparable components.

Figure 1:
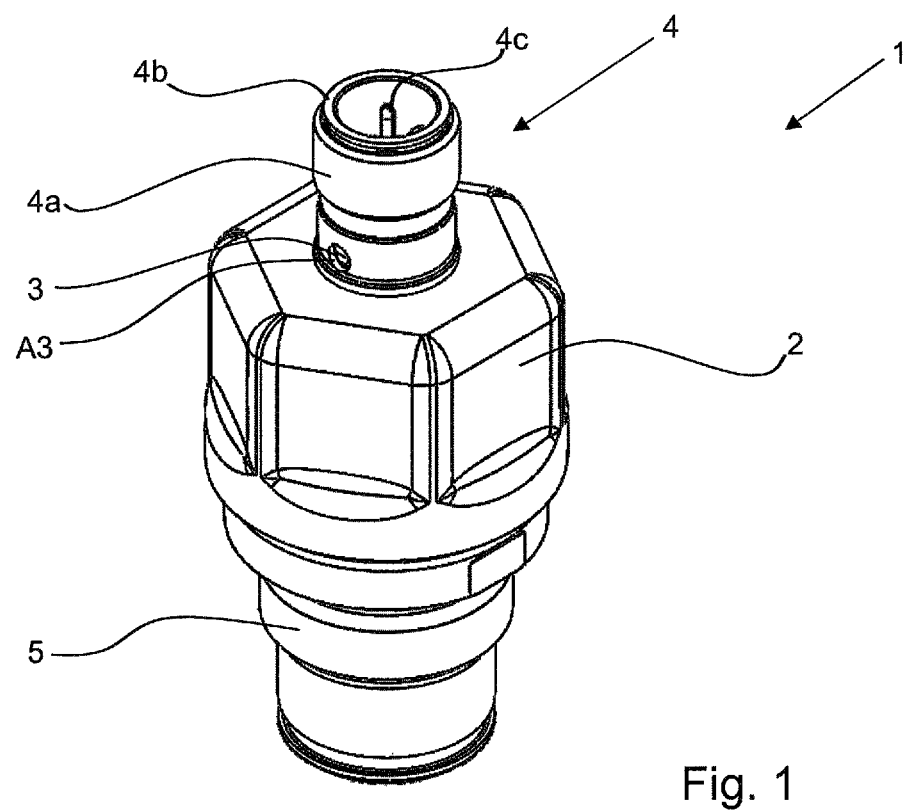
FIG. 1 depicts a pressure measuring device according to the present invention comprising a vent opening provided laterally at the plug connection as a part of the air passage.

FIG. 1 shows a pressure measuring device 1 according to the present invention, which can be used for example in process measurement technology. It comprises essentially a process connection 5 and a housing 2 mounted thereon, wherein the process connection 5 includes the measuring sensor (not shown), which in the case of pressure measuring devices can be designed, for example, as a capacitive or resistive pressure measuring cell, and the housing 2 comprises evaluation electronics (not shown) in order to be able to evaluate the measuring signal and to display it by means of a display device (if present) integrated in the housing 2 and/or to process it by means of a downstream control unit.

In addition, the measuring device 1 comprises a plug connection 4 at an end opposite the process connection 5.

Via this plug connection 4 the measuring device 1 is connected to a power supply and/or to a data processing unit or control unit which receives and evaluates the measurement signals. Usually, the plug connection is designed in the size M12 according to EN 61076 and comprises essentially of a cylindrical sleeve 4a and an insert part 4b, which is designed as a plastic injection-molded part and includes contact pins 4c. The sleeve 4a has an external thread and, like the housing 2, is made mostly of metal, preferably of stainless steel. As shown, the plug connection can be arranged in the direction of the longitudinal axis of the measuring device 1, as is typical for compact devices without a display unit, but it can also be arranged protruding laterally from the housing 2.

The sleeve 4a further comprises a recess A3, which represents an opening to the duct system 10 as a part of the air passage 3 and by means of which pressure compensation between the interior and the exterior of the housing can be achieved. In particular for pressure measuring devices, an air passage 3 is necessary as a venting opening in order to be able to indicate the measured pressure value of a fluid. e.g. inside a container, in relation to the atmospheric pressure, the so-called relative pressure. On the other hand, moisture is drained from the interior of the housing to the outside via this air passage.

Figure 2:
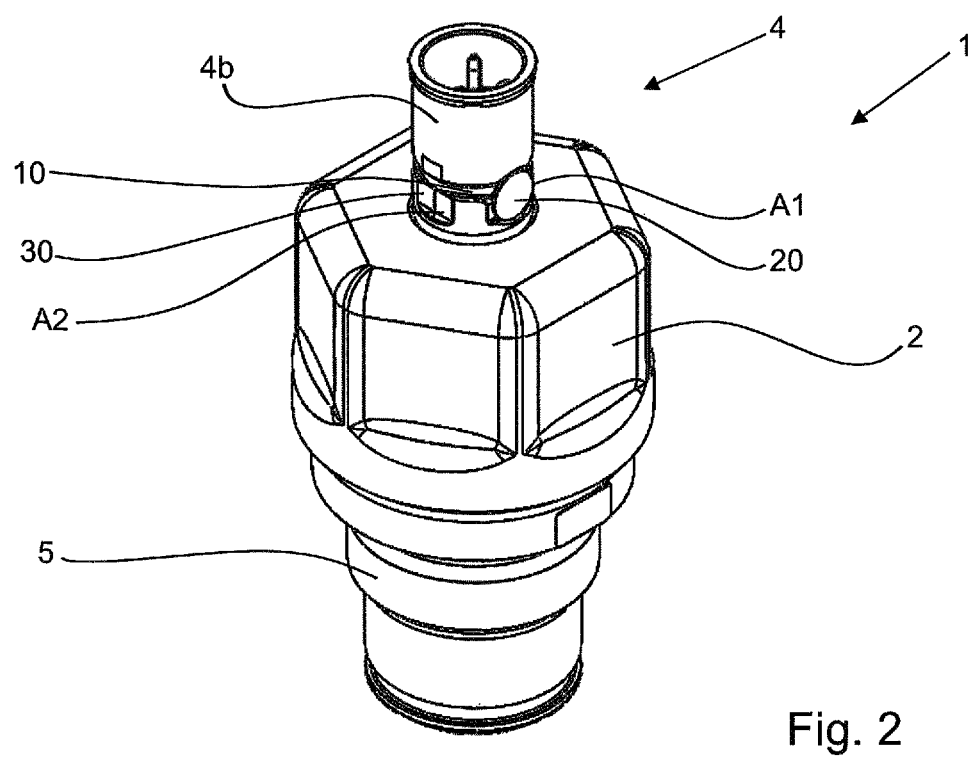
FIG. 2 depicts the pressure measuring device of FIG. 1 without a cylindrical sleeve at the plug connection.

FIG. 2 shows the pressure measuring device from FIG. 1, in which, however, the cylindrical sleeve 4a of the plug connection 4 is omitted. It can be seen that a light-emitting diode 30 is located behind the recess A3 of the cylindrical sleeve 4a known from FIG. 1. Due to this special arrangement, the light-emitting diode 30 is visible from the outside. The light-emitting diode 30 itself is arranged in a recess A2 in the insertion part 4b of the plug connection 4 and can be designed in various ways. For example, a round or flat design is conceivable. For the purpose of a further protective measure, it can also shine through a transparent cover. Furthermore, it is conceivable to arrange the light-emitting diode 30 further into the interior of the insert connector 4 or of the housing 2 and to signal optical status information via translucent bodies, such as light guides, in the recess A2.

In or at the insertion part 4b of the plug connection 4 the air passage 3 is arranged, which comprises a first liquid barrier in the form of a duct system 10 and a second liquid barrier, which is formed as a liquid-repellent diaphragm 20. Via a first part of the duct system 10, the air passes from the interior of the housing 2 to the diaphragm 20, which is arranged in a recess A1 in the insert part 4b. For good retention of the diaphragm 20, it is advantageous if the recess A1 comprises an enlarged diameter compared to the duct system in order to provide a bearing surface for the diaphragm 20. The diaphragm 20 can be glued to the support surface or held biased against it by means of a spring element. Ultrasonic welding is also possible. The diaphragm is made of a chemically inert material that allows only gaseous substances to pass through. From the diaphragm 20, the air is guided via a second part of the duct system 10 in the direction of the recess for the light-emitting diode 20. This second part of the duct system 10 is advantageously designed as a notch-like recess at the outside of the insert part 4b. The inside of the cylindrical sleeve 4a then provides a boundary, such that the notch-like recess 11 becomes a through channel.

Figure 3:
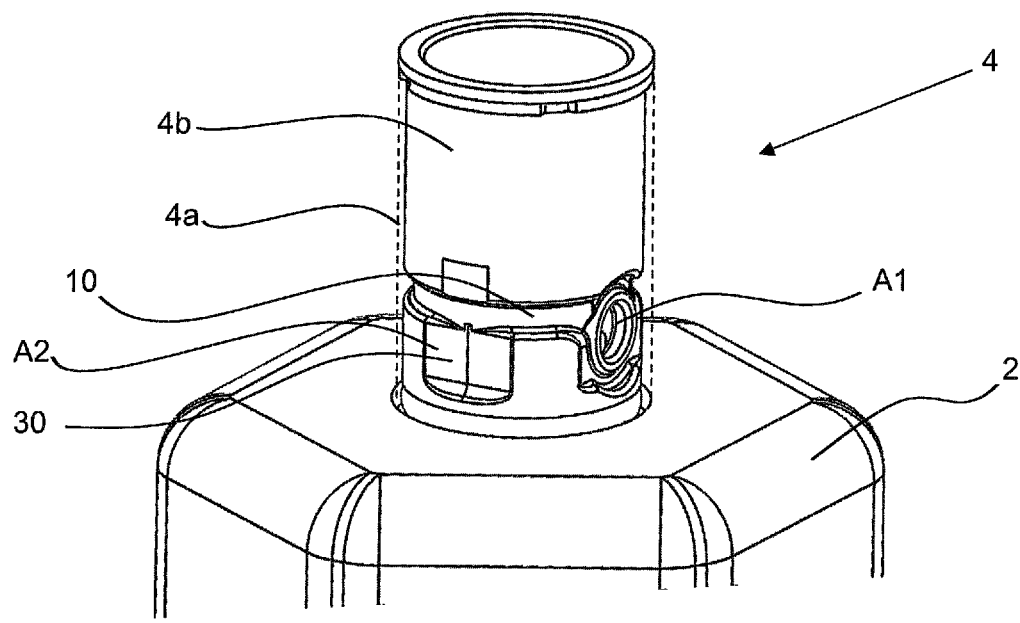
FIG. 3 is an enlarged representation of the plug connection area of the pressure measuring device according to the present invention.
Figure 4:
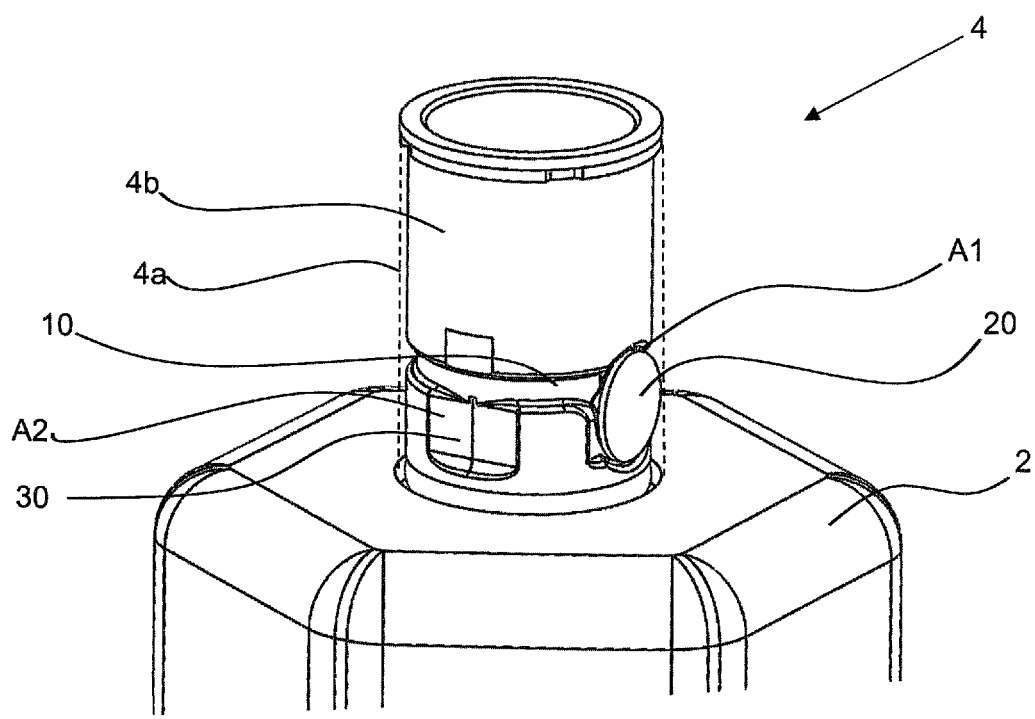
FIG. 4 is a further enlarged representation of the plug connection area of the pressure measuring device according to the present invention.

FIGS. 3 and 4 show enlarged views of the upper part of the pressure measuring device 1, more specifically the area of the plug connection 4. Here, the cylindrical sleeve 4a is indicated only in dashed lines to better show the area behind it. In FIG. 3, the diaphragm 20 is omitted, so that the mouth of the first part of the duct system 10 is visible in the recess A1 for the diaphragm 20. The second part of the duct system 10, which connects the two recesses A1, A2 with each other, is preferably designed circumferentially around the plug connection 4, so that an unhindered air movement between the two recesses A1, A2 is possible. In FIG. 3, the cover A1 with diaphragm 20 is shown.

LIST OF REFERENCE SYMBOLS

1 pressure measuring device
2 housing
3 air passage
4 plug connection
4a cylindrical sleeve
4b insert part
4c contact pin
5 process connection
10 duct system
20 diaphragm
30 light-emitting diode
A1 first recess of the insert part
A2 second recess of the insert part
A3 recess of the cylindrical sleeve While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. A pressure measuring device comprising a housing (2), a pressure measuring cell, evaluation electronics for processing the measurement signals generated by the pressure measuring cell, a plug connection (4) formed at the housing (2) for transmitting the processed measurement signals to an external receiving unit and an air passage (3) which permits pressure compensation between the interior of the housing and the exterior of the housing,
wherein the plug connection (4) comprises a cylindrical sleeve (4a) and an insert member (4b) disposed therein;
wherein the air passage (3) is formed as a two-part barrier comprising a first liquid barrier formed as a duct system (10) from the interior of the housing via the plug connection (4), and a second liquid barrier comprising a liquid-repellent diaphragm (20) and disposed in an area within the duct system (10);
and wherein the insert member (4b) comprises a first recess (A1) into which the diaphragm (20) is inserted;
wherein the insert member (4b) comprises a second recess (A2) which is disposed at a distance from the first recess (A1) and in which a light-emitting diode (30) is inserted, which signals a status of the measuring device (1);
wherein the cylindrical sleeve (4a) also comprises a recess (A3) at the side opposite the light-emitting diode (30), which recess (A3) on the one hand, acting as a part of the duct system (10) or air passage (3), allows the pressure compensation and, on the other hand, allows the light-emitting diode (30) to be visible.

2. The pressure measuring device according to claim 1, wherein the duct system (10) extends between the sleeve (4a) and the insert member (4b).

3. The pressure measuring device according to claim 1, wherein the insert member (4b) is designed as a plastic injection-molded part and the cylindrical sleeve (4a) is made of metal.

4. The pressure measuring device according to claim 1, wherein the light-emitting diode (30) is inserted in the second recess (A2) in a sealed manner.

5. The pressure measuring device according to claim 1, wherein the light-emitting diode (30) is arranged in the second recess (A2) behind a transparent cover.

6. The pressure measuring device according to claim 1, wherein the light-emitting diode (30) is arranged inside the measuring device (1) and status information is indicated via translucent bodies in the second recess (A2).

* * * * *